US011112729B1

(12) United States Patent
Zhu et al.

(10) Patent No.: US 11,112,729 B1
(45) Date of Patent: Sep. 7, 2021

(54) DEVELOPER SUPPLY DEVICE

(71) Applicant: JIANGXI KILIDER TECHNOLOGY CO., LTD., Shangrao (CN)

(72) Inventors: Jinjun Zhu, Shangrao (CN); Zhongxi Li, Shangrao (CN); Jiabing He, Shangrao (CN)

(73) Assignee: JIANGXI KILIDER TECHNOLOGY CO, LTD., Shangrao (CN)

( * ) Notice: Subject to any disclaimer, the term of this patent is extended or adjusted under 35 U.S.C. 154(b) by 0 days.

(21) Appl. No.: 17/155,110

(22) Filed: Jan. 22, 2021

(30) Foreign Application Priority Data

Dec. 9, 2020 (CN) ......................... 202011445230.0

(51) Int. Cl.
*G03G 15/08* (2006.01)

(52) U.S. Cl.
CPC ....... *G03G 15/0886* (2013.01); *G03G 15/087* (2013.01); *G03G 15/0889* (2013.01); *G03G 2215/067* (2013.01); *G03G 2215/0692* (2013.01)

(58) Field of Classification Search
CPC ............. G03G 15/0886; G03G 15/087; G03G 15/0868; G03G 15/0884; G03G 2215/0668; G03G 2215/067; G03G 2215/0685; G03G 2215/0692
See application file for complete search history.

(56) References Cited

U.S. PATENT DOCUMENTS

| | | | | |
|---|---|---|---|---|
| 6,785,497 | B1 * | 8/2004 | Hasebe | G03G 15/0872 222/DIG. 1 |
| 2006/0104663 | A1 * | 5/2006 | Kitazaki | G03G 15/0886 399/111 |
| 2009/0279916 | A1 * | 11/2009 | Naito | G03G 15/0872 399/106 |
| 2017/0269506 | A1 * | 9/2017 | Morita | G03G 15/0886 |
| 2017/0285529 | A1 * | 10/2017 | Nishiyama | G03G 15/087 |
| 2020/0103788 | A1 * | 4/2020 | Furukawa | G03G 15/0886 |

* cited by examiner

*Primary Examiner* — Robert B Beatty

(57) ABSTRACT

A developer supply device includes a cylinder body and a left side cover and a right side cover respectively connected to two ends of the cylinder body. The left side cover is provided with a gear shaft system. The right side cover is provided with a powder outlet assembly including a seal provided on the right side cover. The seal is provided thereon with an inner powder outlet. Another end of the screw conveying rod is arranged within the seal. The seal is further provided at two ends thereof with radially protruding limit rings respectively. A sealing barrier is coaxially provided outside the seal between the two limit rings. The sealing barrier is provided thereon with an outer powder outlet and a shift block. The limit ring close to the cylinder body is provided thereon with an arc-shaped rotating slide groove having an end in communication with a limit slot.

8 Claims, 9 Drawing Sheets

DEVELOPER SUPPLY DEVICE

CROSS-REFERENCE TO RELATED APPLICATIONS

This application claims priority to Chinese Patent Application No. 202011445230.0 filed on Dec. 9, 2020, the contents of which are incorporated herein by reference.

TECHNICAL FIELD

The present invention relates to the field of developer replenishing cartridges, especially to a developer supply device that is detachably mounted to an image forming device such as a copying machine, a fax machine, a printer, or a multi-function machine having two or more functions of these devices.

BACKGROUND

A conventionally known image forming device is provided with a carrier, a developing device, a developer supply container, and a storage container. If developer is supplied from the developing device to the image carrier, an electrostatic latent image formed on the image carrier is developed as a developer image. The developer supply container is provided with a developer discharge port through which developer replenisher is supplied to a replenishment port provided in the developing device.

However, during operation of an existing developer supply container, a seal on a developer discharge port thereof may be accidentally touched and thus opened when the developer supply container is not in use, in which case developer will drop, and thus a sealing effect cannot be achieved. In addition, what is currently used at a sensing position is a torsion spring. As is known to all, springs have a limited service life. Therefore, when the spring fails, it will cause errors of sensing in the image forming device.

SUMMARY OF THE INVENTION

Directed against the problems proposed in the forgoing background section, the present invention provides a developer supply device. The present invention will be further described below.

The developer supply device includes a cylinder body and a left side cover and a right side cover respectively connected to two ends of the cylinder body. The left side cover is provided with a gear shaft system, the gear shaft system being provided at an outside thereof with a gear side cover connected to the left side cover. The cylinder body is provided therein with a screw conveying rod and a stirring rod, an end of the screw conveying rod and an end of the stirring rod being respectively connected to two outputs of the gear shaft system. The right side cover is provided with a powder outlet assembly which includes a seal provided on the right side cover. The seal is provided thereon with an inner powder outlet. Another end of the screw conveying rod is arranged within the seal. The seal is further provided at two ends thereof with radially protruding limit rings respectively. A sealing barrier is coaxially provided outside the seal between the two limit rings, the sealing barrier being provided thereon with an outer powder outlet and a shift block. The limit ring close to the cylinder body is provided thereon with an arc-shaped rotating slide groove, an end of the rotating slide groove being in communication with a limit slot. The sealing barrier is provided at an end thereof with a radially protruding elastic protrusion, the elastic protrusion being provided at a bottom thereof with a slide block.

Preferably, a sponge is provided between the seal and the sealing barrier to fill a gap between the seal and the sealing barrier.

Preferably, the limit ring close to the cylinder body is provided thereon radially outward with a protruding positioning lug, and the cylinder body is provided at an end thereof close to the right side cover with a positioning post. The positioning lug is coaxially sleeved on the positioning post.

Preferably, a position and an arc length of the rotating slide groove are such that, when the sealing barrier is at two ends of the rotating slide groove, the inner powder outlet and the outer powder outlet overlap or are completely staggered.

Preferably, the right side cover is welded to the cylinder body via an ultrasonic welding material, and is pressed onto an upper end surface of the positioning post by a pressing portion provided, to prevent the positioning lug from jumping.

Preferably, the cylinder body is further provided with a replenishment port located outside the right side cover. Through the replenishment port, developer may be replenished into the cylinder body. This can realize repeated use and realize replenishment in a more convenient way. Such integrated design and layout produces less ultrasonic welding areas between the cylinder body and the right side cover and enhances fixing effects.

Preferably, the gear shaft system includes an elastic buckle gear, a stirring gear, a transmission gear, and a conveying gear which are provided on the left side cover and meshed in sequence. The screw conveying rod and the stirring rod are respectively connected to the conveying gear and the stirring gear.

Preferably, a turntable is connected to the elastic buckle gear. The turntable has a gap and is provided at an edge thereof with a deformation groove and has an elastic buckle formed at the deformation groove. The left side cover is provided with a positioning member on which the elastic buckle may be positioned.

Preferably, the gear side cover is provided with a gear side cover positioning spot and a sensing hole, and the elastic buckle gear is an irregular gear having a number of teeth that allow a certain angle of rotation of the elastic buckle gear in mesh transmission with the stirring gear to cause the elastic buckle to fit onto the gear side cover positioning spot.

The present invention has the following beneficial effects. Compared with the prior art, the present invention provides the seal with the elastic protrusion. Under normal circumstances, an accidental touch will not cause overlapping of the inner powder outlet on the seal and the outer powder outlet on the sealing barrier. That is, it avoids outward leaking of the developer due to an accidental touch. Besides, by replacing the configuration of a torsion spring with the coordination between the elastic buckle and the positioning member as well as the coordination between the turntable and the gear side cover positioning spot, the mode of on-machine recognition is changed, which avoids the risk of improper functioning caused by sensing errors of the image forming device due to structural fatigue. Furthermore, structures and spatial layout of the powder outlet assembly and the right side cover are optimized, and the replenishment port on the cylinder body is exposed outside the right side cover, which facilitates replenishment of developer into the cylinder body so as to realize repeated use.

Figure 1:
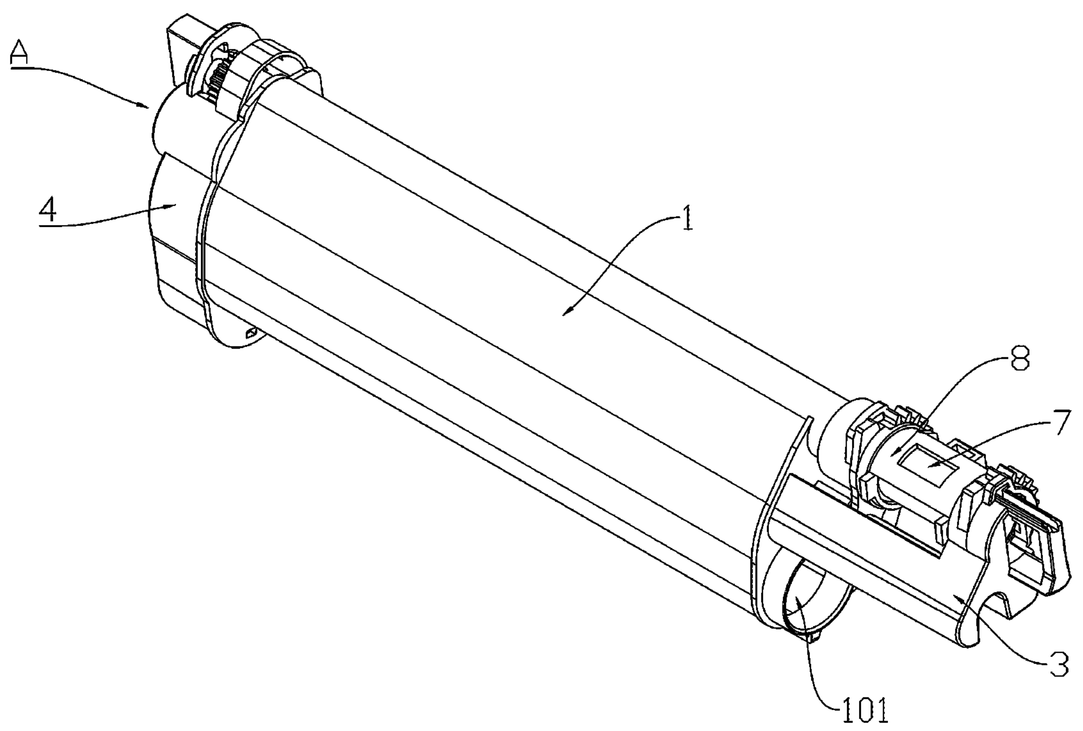
FIG. 1 is a schematic diagram showing a structure of the present invention.
Figure 2:
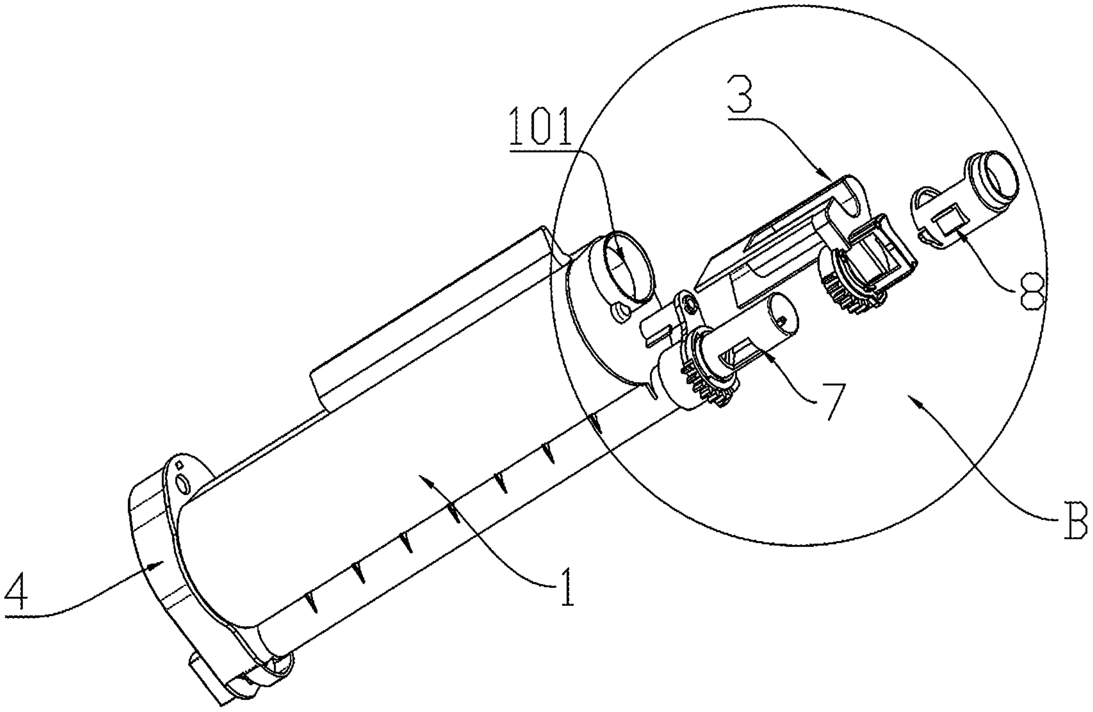
FIG. 2 is an exploded schematic diagram showing the structure of the present invention.
Figure 3:
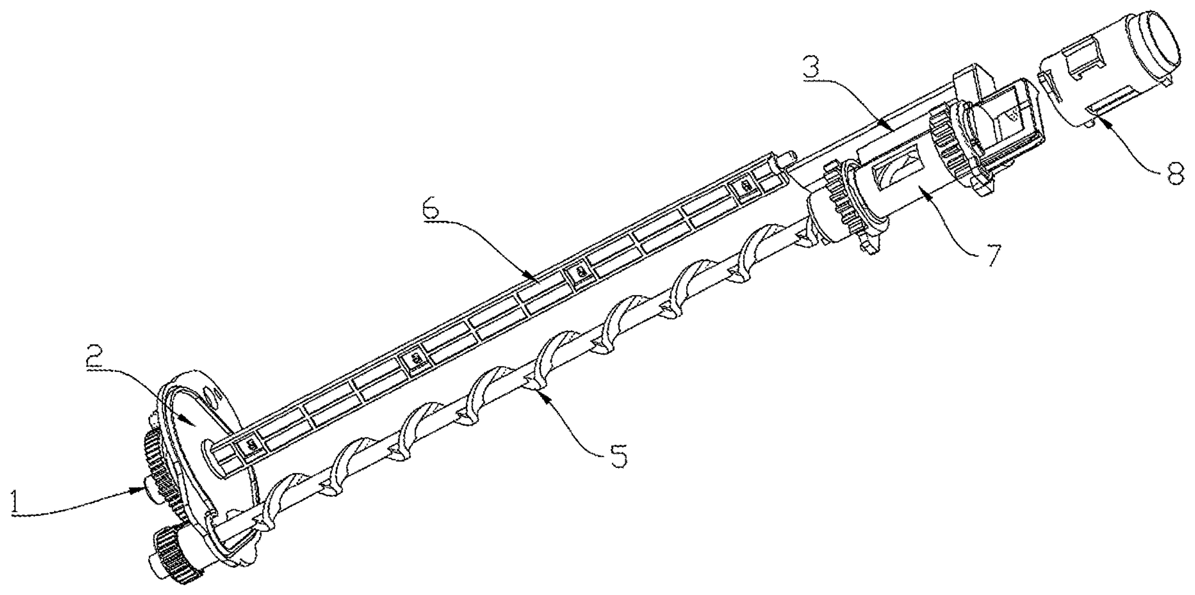
FIG. 3 is a schematic diagram showing the structure with a cylinder body shown in FIG. 2 being removed.
Figure 4:
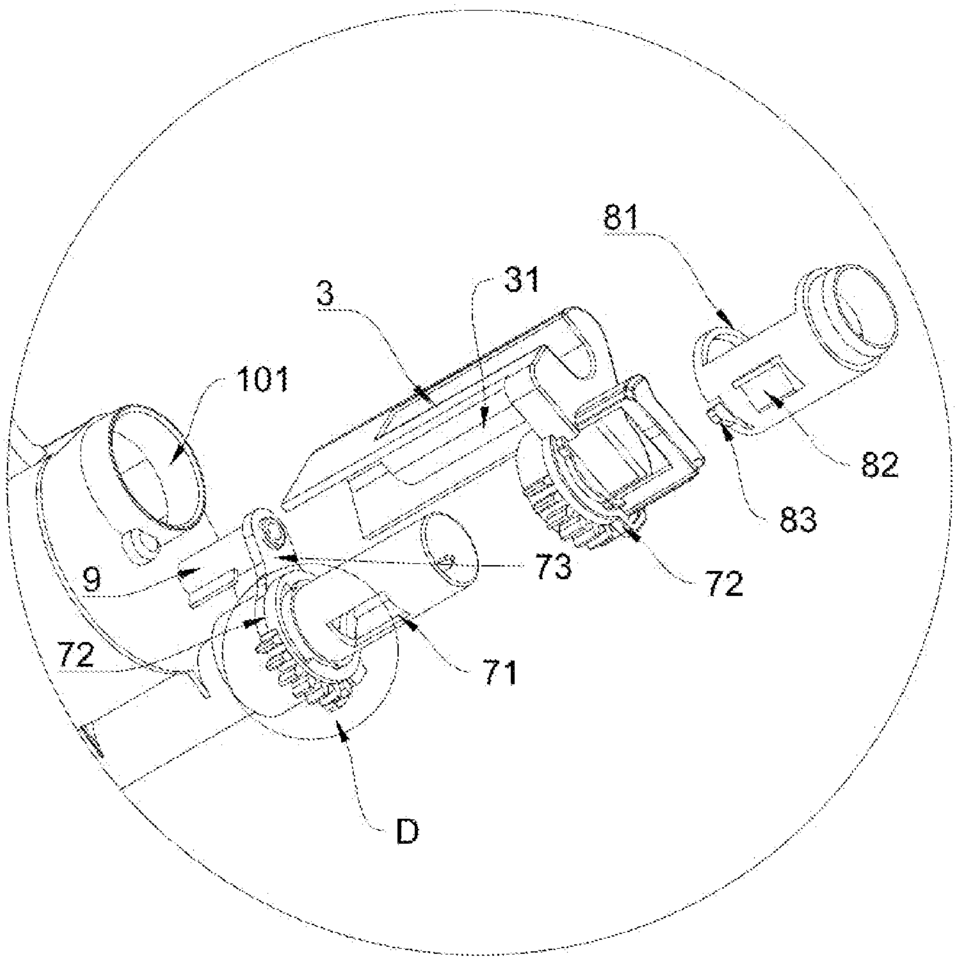
FIG. 4 is an enlarged schematic diagram showing the structure at B shown in FIG. 2.
Figure 5:
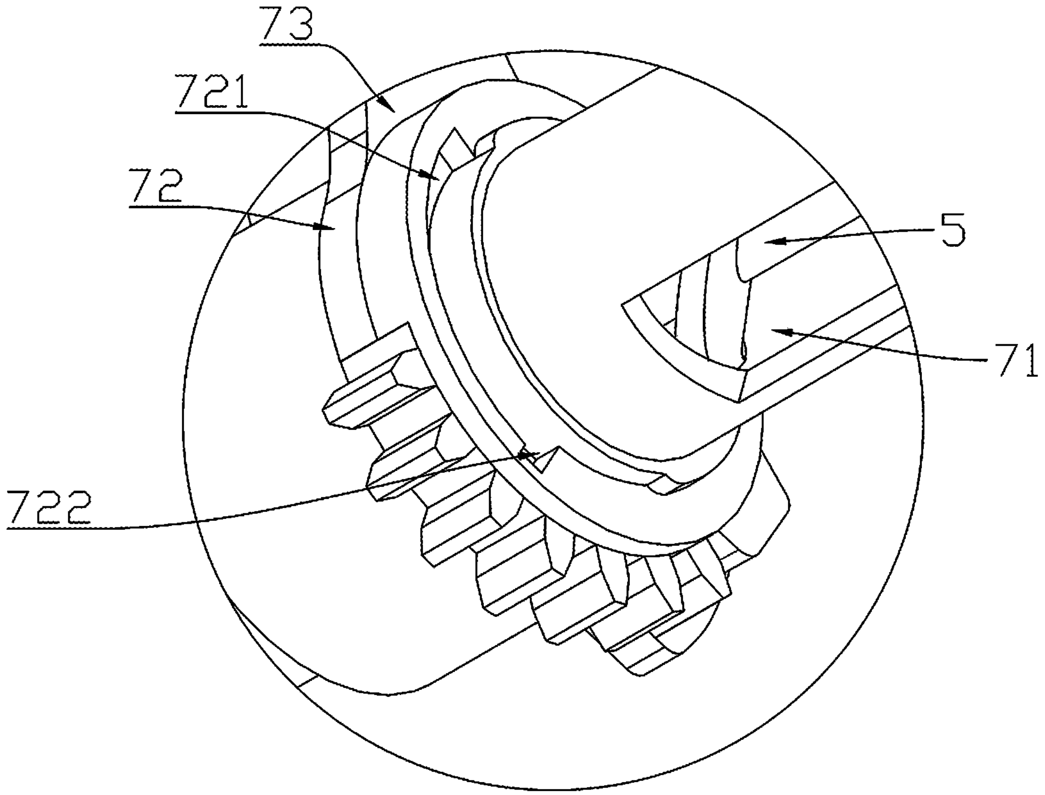
FIG. 5 is an enlarged schematic diagram showing the structure at D shown in FIG. 4.
Figure 6:
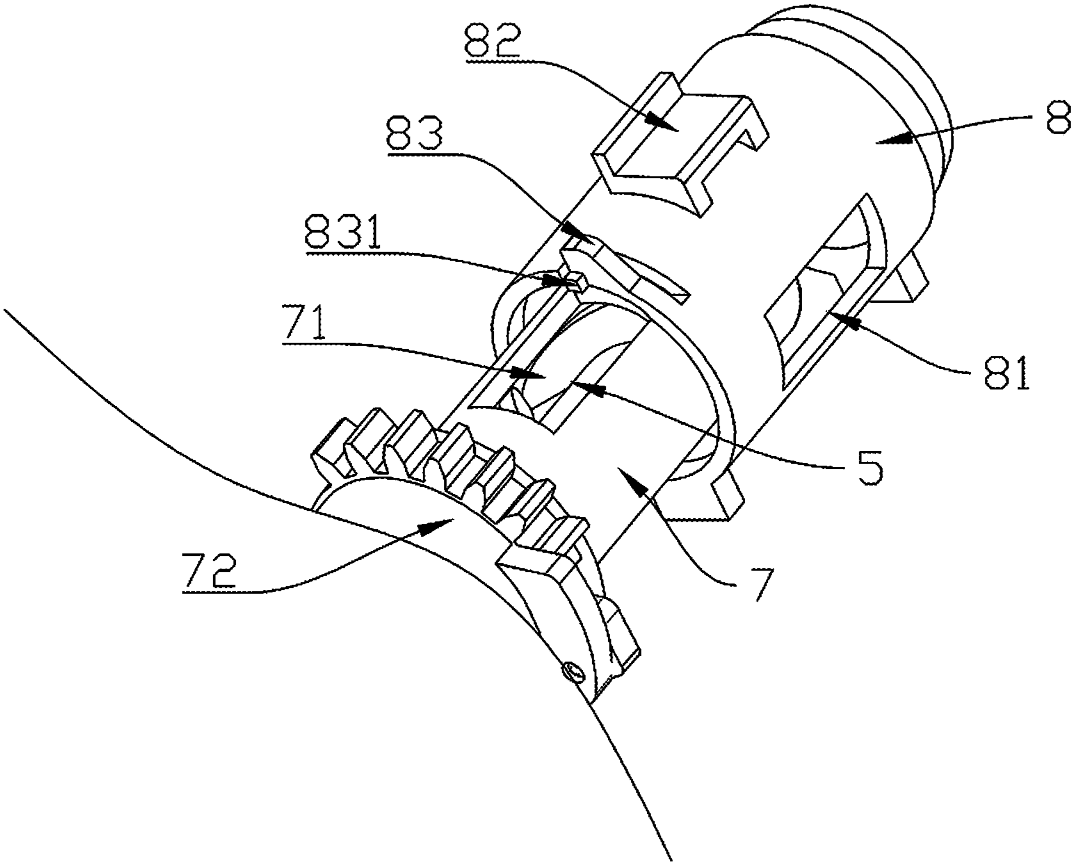
FIG. 6 is a schematic diagram showing structures of a seal 7 and a sealing barrier 8.

In the figures: cylinder body 1, replenishment port 101, left side cover 2, right side cover 3, gear side cover 4, sensing hole 41, screw conveying rod 5, stirring rod 6, seal 7, inner powder outlet 71, limit ring 72, rotating slide groove 721, limit slot 722, positioning lug 73, sealing barrier 8, outer powder outlet 81, shift block 82, elastic protrusion 83, slide block 831, positioning post 9, elastic buckle gear 10, stirring gear 11, transmission gear 12, conveying gear 13, turntable 14, deformation groove 141, elastic buckle 142.

DETAILED DESCRIPTION

Specific embodiments of the present invention will be described in detail below with reference to FIGS. 1 to 9.

A developer supply device includes a cylinder body 1, and a left side cover 2 and a right side cover 3 respectively connected to two ends of the cylinder body 1. The left side cover 2 is provided with a gear shaft system. The gear shaft system is provided at an outside thereof with a gear side cover 4 connected to the left side cover 2. An input of the gear shaft system is connected to a drive element of an image forming device in which the developer supply device is installed. The cylinder body 1 is provided therein with a screw conveying rod 5 and a stirring rod 6. An end of the screw conveying rod 5 and an end of the stirring rod 6 are respectively connected to two outputs of the gear shaft system. The other end of the stirring rod 6 is connected to an inner end of the cylinder body 1. The stirring rod 6 rotates along with rotation of the gear shaft system driven by the drive element of the image forming device, thereby stirring developer in the cylinder body 1 to prevent the developer from caking. The right side cover 3 is provided with a powder outlet assembly to which the other end of the screw conveying rod 5 is connected. The screw conveying rod 5 also rotates when driven by the gear shaft system, so as to push the developer in the cylinder body 1 towards the powder outlet assembly.

Referring to FIGS. 2 to 6, the powder outlet assembly includes a seal 7 provided on the right side cover 3. The seal 7 is provided with an inner powder outlet 71. Said other end of the screw conveying rod 5 is arranged within the seal 7. The seal 7 is also provided at both ends thereof with radially protruding limit rings 72. A sealing barrier 8 is coaxially arranged outside the seal 7 between the two limit rings 72. The sealing barrier 8 is rotatable relative to the seal 7. The sealing barrier 8 is provided with an outer powder outlet 81 which has a same size as the inner powder outlet 71. When the inner powder outlet 71 overlaps the outer powder outlet 81, a powder outlet is opened so that the developer can be conveyed outwards. When the inner powder outlet 71 and the powder outlet 81 are staggered, the powder outlet is closed. The sealing barrier 8 is provided with a shift block 82, which replaces a torsion spring in an existing technology. After the developer supply device is installed into the image forming device, the drive element on the image forming device acts on the shift block 82 to rotate the sealing barrier 8 relative to the seal 7 so as to open or close the powder outlet. In this way, the device can have a long service life.

In practice, when the developer supply device of the present invention is not installed on the image forming device, an accidental touch may open the powder outlet, which happens in a significantly higher probability in the case of the technical solution of the present invention in which the shift block 82 is used to replace the torsion spring in the existing technology. In view of the this, the present invention is further provided with a structure to prevent accidental opening of the powder outlet. Specifically, the limit ring 72 close to the cylinder body 1 is provided thereon with an arc-shaped rotating slide groove 721. An end of the rotating slide groove 721 is in communication with a limit slot 722. An end of the sealing barrier 8 is provided with a radially protruding elastic protrusion 83. The elastic protrusion 83 is provided at a bottom thereof with a slide block 831. When the developer supply device of the present invention is not installed, the slide block 831 is stuck in the limit slot 722. Coordination between the slide block 831 and the limit slot 722 avoids accidental opening of the powder outlet. After the developer supply device is installed, the elastic protrusion 83 may be pushed to deform manually or by an element on the image forming device, as a consequence of which the slide block 831 disengages from the limit slot 722 and fall into the rotating slide groove 721 in which the slide block 831 slides to open or close the powder outlet.

In order to further improve sealing performance, in this embodiment, a sponge is provided between the seal 7 and the sealing barrier 8, so as to fill a gap between the seal 7 and the sealing barrier 8.

In the present invention, the slide block 831 is rotated in the rotating slide groove 721 so that the inner powder outlet 71 and the outer powder outlet 81 overlap to open the powder outlet, from which point it can be appreciated that an angle of rotation of the seal 7 relative to the sealing barrier 8 and an angle of rotation of the sealing barrier 8 relative to the seal 7 have to be controlled strictly consistent. In this embodiment, the limit ring 72 close to the cylinder body 1 is provided radially outward with a protruding positioning lug 73, and the cylinder body 1 is provided at an end thereof close to the right side cover 3 with a positioning post 9. The positioning lug 73 is coaxially sleeved on the positioning post 9. This ensures first that during installation a mounting position of the seal 7 is fixed, and then by determining a position and an arc length of the rotating slide groove 721, it can be ensured that the powder outlet enters an opening state and a closing state right when two extreme positions at a stroke range of the sealing barrier 8 are reached respectively.

The right side cover 3 is welded to the cylinder body 1 via an ultrasonic welding material, and is pressed onto an upper end surface of the positioning post 9 by a pressing portion 31 provided to prevent the positioning lug 73 from jumping.

It should be noted that, based on integrated design of the right side cover 3, the seal 7, and the sealing barrier 8 of the present invention, it is allowed that the cylinder body 1 of the present invention is also provided with a replenishment port 101 located outside the right side cover 3. Through the replenishment port 101, developer may be replenished into the cylinder body 1 to realize repeated use. Compared with the existing technology in which a replenishment port is not provided or a replenishment port is provided inside the right side cover 3, the present invention realizes replenishment of the developer or replenishment of the developer in a more convenient way. The integrated design and layout produces less ultrasonic welding areas between the cylinder body 1 and the right side cover 3 and enhances fixing effects.

Figure 7:
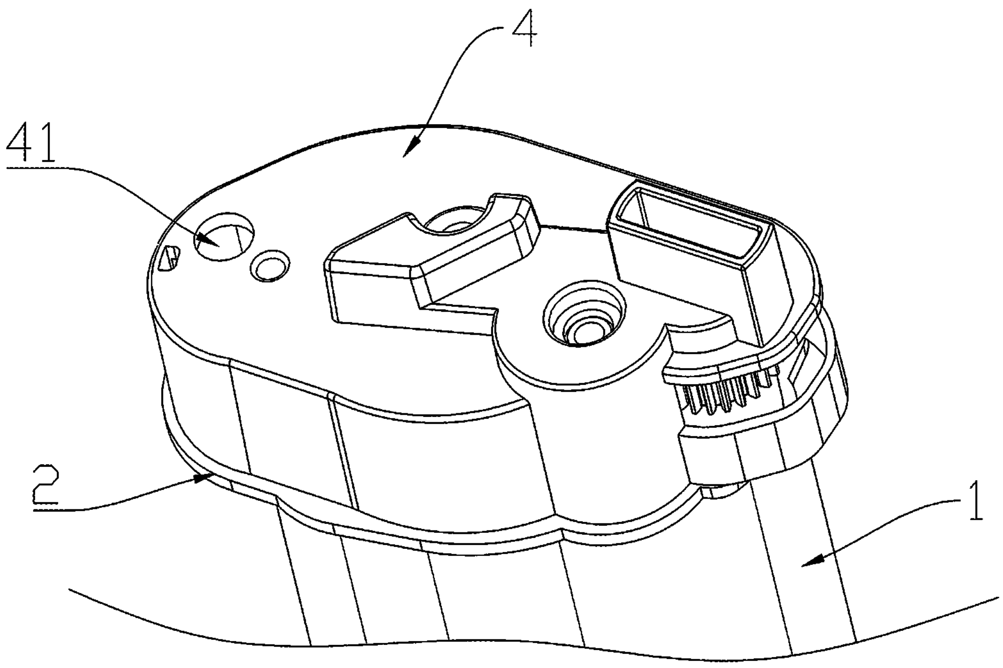
FIG. 7 is a schematic diagram showing the structure at A shown in FIG. 1.
Figure 8:
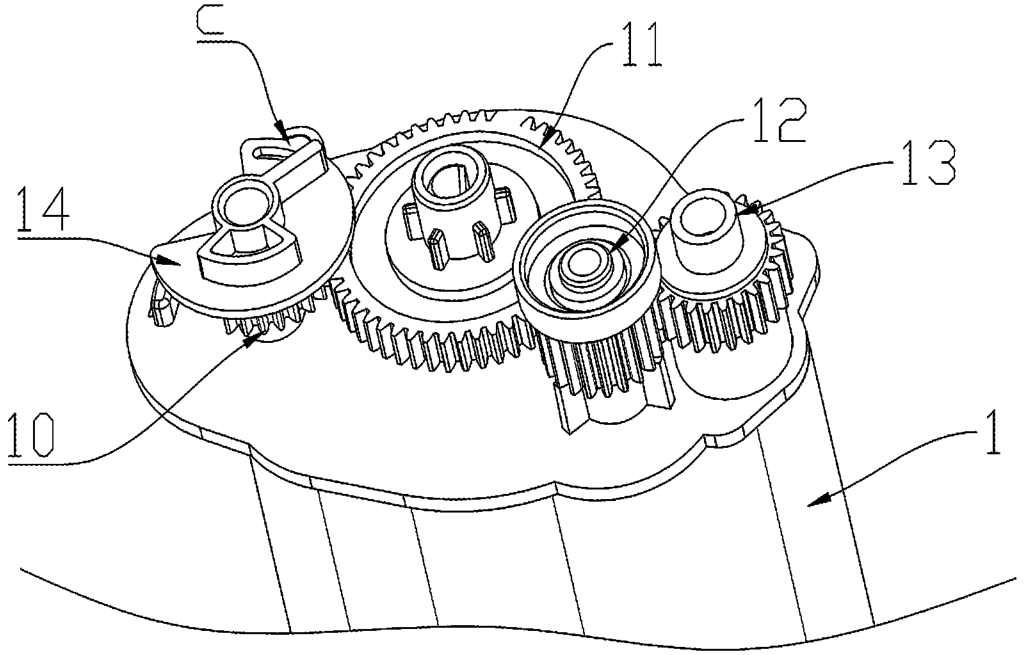
FIG. 8 is a schematic diagram showing the structure shown in FIG. 7 with a gear side cover 4 being removed.
Figure 9:
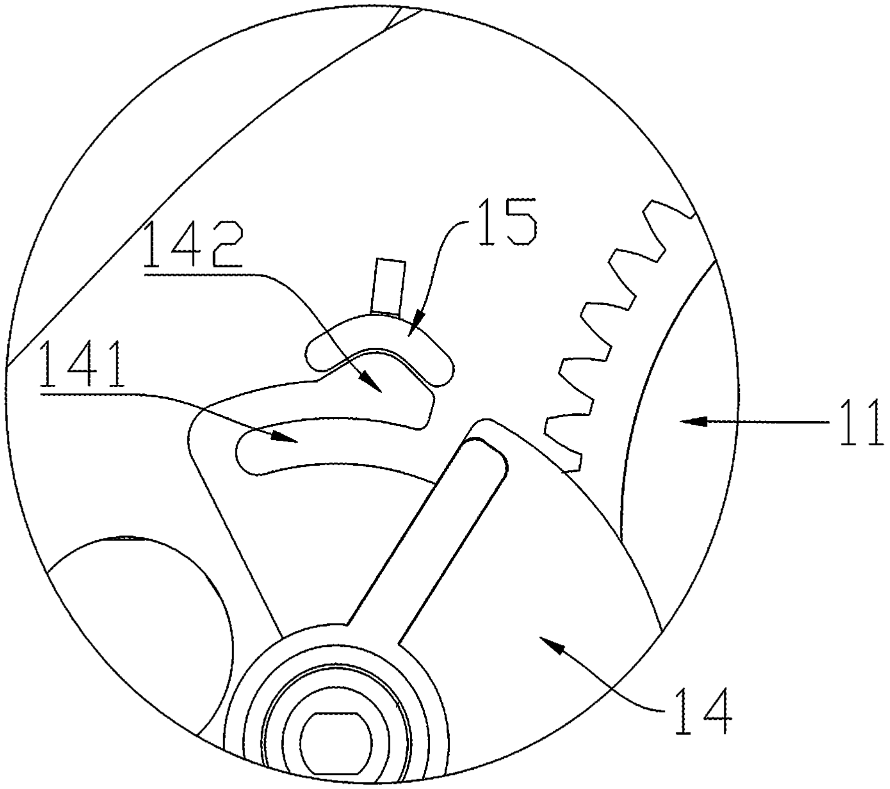
FIG. 9 is an enlarged schematic diagram showing the structure at C shown in FIG. 8.

Referring to FIGS. 7 to 9, the gear shaft system includes an elastic buckle gear 10, a stirring gear 11, a transmission gear 12, and a conveying gear 13, which are provided on the left side cover 2 and meshed in sequence. The screw conveying rod 5 and the stirring rod 6 are respectively connected to the conveying gear 13 and the stirring gear 11 to rotate synchronously therewith. The conveying gear 13 is connected to the drive element of the image forming device, so that the image forming device drives the gear shaft system to rotate.

The present invention also changes the mode of on-machine recognition. The on-machine recognition in all the existing technologies is realized by providing a torsion spring on the elastic buckle gear 10 for recognition, and also, the service life of the torsion spring limits the overall service life. It should be noted that the elastic buckle gear 10 here mentioned is with respect to this embodiment, and in the existing technologies the torsion spring only needs to be arranged on a gear. In this embodiment, a turntable 14 is connected to the elastic buckle gear 10. The turntable 14 has a gap and is provided at an edge thereof with a deformation groove 141. The deformation groove 141 is obtained by cutting the turntable 14 and then an elastic buckle 142 is formed. The elastic buckle 142 may be deformed towards the deformation groove 141. The left side cover 2 is provided with a positioning member 15. The elastic buckle 142, when not activated, is positioned on the positioning member 15. The elastic buckle gear 10 is an irregular gear and meshes with the stirring gear 11. The gear side cover 4 is provided with a gear side cover positioning spot (not shown) and a sensing hole 41. The elastic buckle gear 10 has a number of teeth that allow a certain angle of rotation of the elastic buckle gear 10 to cause the elastic buckle 142 to fit onto the gear side cover positioning spot. Meanwhile, during the rotation of the elastic buckle gear 10, the image forming device senses the rotation of the elastic buckle gear 10 via the sensing hole 41, and then the entire image forming device starts printing.

In the present invention, the seal is provided with the elastic protrusion. Under normal circumstances, an accidental touch will not cause overlapping of the inner powder outlet on the seal and the outer powder outlet on the sealing barrier, which avoids outward leaking of the developer due to an accidental touch. Besides, by replacing the configuration of a torsion spring with the coordination between the elastic buckle and the positioning member as well as the coordination between the turntable and the gear side cover positioning spot, the mode of on-machine recognition is changed, which avoids the risk of improper functioning caused by sensing errors of the image forming device due to structural fatigue. Furthermore, structures and spatial layout of the powder outlet assembly and the right side cover are optimized, and the replenishment port on the cylinder body is exposed outside the right side cover, which facilitates replenishment of developer into the cylinder body to realize repeated use.

The above described is only preferred embodiments of the present invention and is not intended to limit the present invention. For those skilled in the art, various modifications and changes may be made to the present invention. Any modifications, equivalent replacement, improvement, etc. made within the spirit and principles of the present invention shall be included in the protection scope of the present invention.

What is claimed is:

1. A developer supply device, comprising a cylinder body and a left side cover and a right side cover respectively connected to two ends of the cylinder body, wherein the left side cover is provided with a gear shaft system, the gear shaft system being provided at an outside thereof with a gear side cover connected to the left side cover, and the cylinder body is provided therein with a screw conveying rod and a stirring rod, an end of the screw conveying rod and an end of the stirring rod being respectively connected to two outputs of the gear shaft system, characterized in that:

the right side cover is provided with a powder outlet assembly which comprises a seal provided on the right side cover, wherein the seal is provided thereon with an inner powder outlet; another end of the screw conveying rod is arranged within the seal; and the seal is further provided at two ends thereof with radially protruding limit rings respectively, wherein a sealing barrier is coaxially provided outside the seal between the two limit rings, the sealing barrier being provided thereon with an outer powder outlet and a shift block; and the limit ring closest to the cylinder body is provided thereon with an arc-shaped rotating slide groove, an end of the rotating slide groove being in communication with a limit slot, and the sealing barrier is provided at an end thereof with a radially protruding elastic protrusion, the elastic protrusion being provided at a bottom thereof with a slide block.

2. The developer supply device according to claim 1, characterized in that a sponge is provided between the seal and the sealing barrier.

3. The developer supply device according to claim 1, characterized in that the limit ring closest to the cylinder body is provided thereon radially outward with a protruding positioning lug, and the cylinder body is provided at an end thereof closest to the right side cover with a positioning post, the positioning lug being coaxially sleeved on the positioning post.

4. The developer supply device according to claim 3, characterized in that a position and an arc length of the rotating slide groove are such that, when the sealing barrier is at two ends of the rotating slide groove, the inner powder outlet and the outer powder outlet overlap or are completely staggered.

5. The developer supply device according to claim 4, characterized in that the right side cover is welded to the cylinder body via an ultrasonic welding material, and is pressed onto an upper end surface of the positioning post by a pressing portion provided.

6. The developer supply device according to claim 5, characterized in that the cylinder body is further provided with a replenishment port located outside the right side cover, through which replenishment port developer may be replenished into the cylinder body.

7. The developer supply device according to claim 1, characterized in that the gear shaft system comprises an elastic buckle gear, a stirring gear, a transmission gear, and a conveying gear which are provided on the left side cover and meshed in sequence, wherein the screw conveying rod and the stirring rod are respectively connected to the conveying gear and the stirring gear.

8. The developer supply device according to claim 7, characterized in that:

a turntable is connected to the elastic buckle gear, wherein the turntable has a gap, is provided at an edge thereof with a deformation groove, and has an elastic buckle formed at the deformation groove, and the left side cover is provided with a positioning member on which the elastic buckle may be positioned; and the gear side cover is provided with a sensing hole, and the elastic buckle gear is an irregular gear having a number of teeth that allow a certain angle of rotation of the elastic buckle gear in mesh transmission with the stirring gear.

* * * * *